(12) United States Patent
Kwok et al.

(10) Patent No.: US 10,051,700 B1
(45) Date of Patent: Aug. 14, 2018

(54) METHOD AND APPARATUS FOR RETROFITTING FLUORESCENT TUBES TO LIGHT EMITTING DIODES

(71) Applicants: Leo Kwok, Milpitas, CA (US); Simon Siu-Chi Yu, Oakland, CA (US)

(72) Inventors: Leo Kwok, Milpitas, CA (US); Simon Siu-Chi Yu, Oakland, CA (US)

( * ) Notice: Subject to any disclaimer, the term of this patent is extended or adjusted under 35 U.S.C. 154(b) by 0 days.

(21) Appl. No.: 15/433,778

(22) Filed: Feb. 15, 2017

(51) Int. Cl.
*H05B 33/08* (2006.01)
*F21K 9/278* (2016.01)
*F21Y 115/10* (2016.01)

(52) U.S. Cl.
CPC ......... *H05B 33/0824* (2013.01); *F21K 9/278* (2016.08); *H05B 33/0845* (2013.01); *F21Y 2115/10* (2016.08)

(58) Field of Classification Search
CPC ............... H05B 33/08; H05B 33/0806; H05B 33/0824; H05B 33/0845; H05B 33/0887; H05B 41/18; F21K 9/27; F21K 9/278; Y02B 20/386
See application file for complete search history.

(56) References Cited

U.S. PATENT DOCUMENTS

| 6,504,305 | B1 * | 1/2003 | Ohkubo | H05B 41/18 315/58 |
| 6,570,346 | B2 * | 5/2003 | Incze | H05B 41/34 315/105 |
| 8,541,960 | B2 * | 9/2013 | Khalsa | H05B 41/295 315/116 |
| 9,480,123 | B2 * | 10/2016 | Van Dijk | H05B 33/0884 |
| 2011/0260622 | A1 * | 10/2011 | Hartikka | F21V 25/04 315/113 |
| 2012/0181952 | A1 * | 7/2012 | Roeer | H05B 33/0809 315/307 |
| 2015/0061542 | A1 * | 3/2015 | Hsia | F21V 25/04 315/294 |
| 2015/0223303 | A1 * | 8/2015 | Hsia | H05B 33/0884 315/121 |

* cited by examiner

*Primary Examiner* — Thai Pham
(74) *Attorney, Agent, or Firm* — Lyman Moulton, Esq.

(57) ABSTRACT

A multi-group brightness controllable LED tube comprises a multi-input source selector which directs electric power to the tube from a set of diversion switches inserted between a power source and preexisting ballast. The diversion switches automatically re-establish new electric current paths to supply the LED tube power and safely bypass the preexisting ballast. The LED tube also comprises a digital sub section selector for selecting two groups of SMD (surface mounted device) LED strip lights for intensity control. When first turned on, the light will be at 66% brightness. A first toggle action dims the light to 33% brightness, and a second toggle action brings it up to 100%. The third toggle will reset the LED tube to 66% brightness. The retrofitted LED tube is suitable for single end as well as double end fixtures without a complicated conversion process. Furthermore, fixtures can be reverted back to original fluorescent operation.

20 Claims, 16 Drawing Sheets

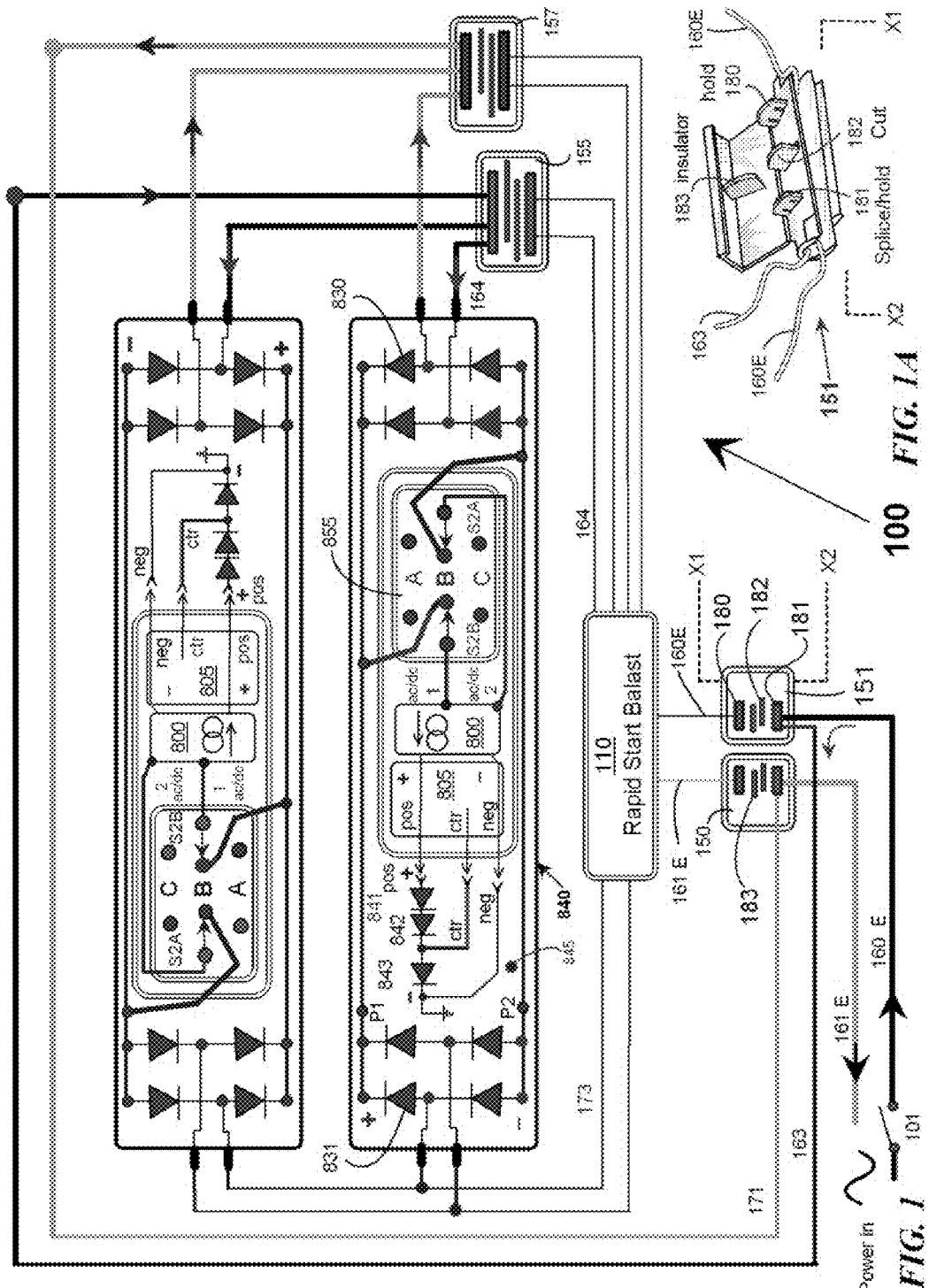

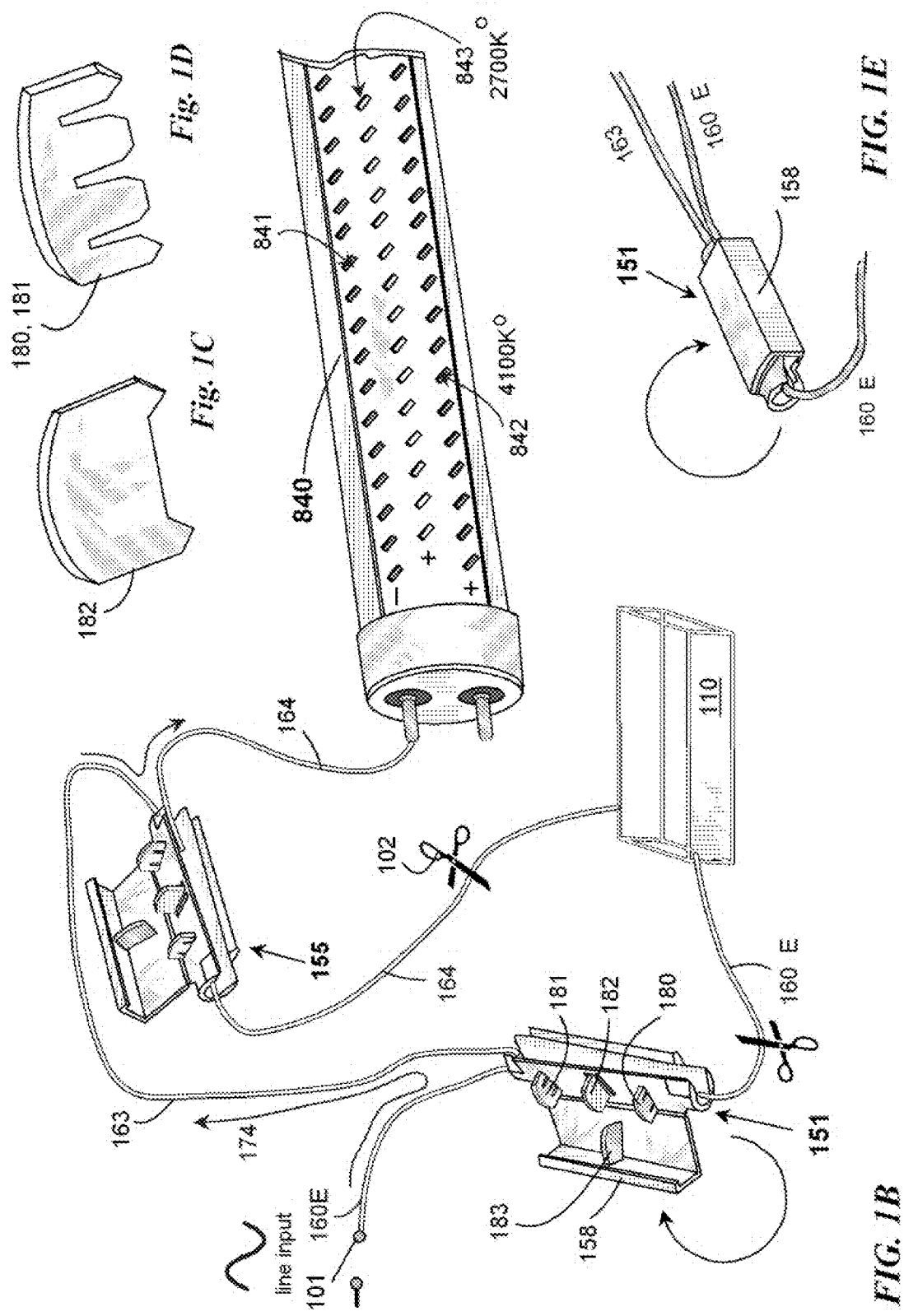

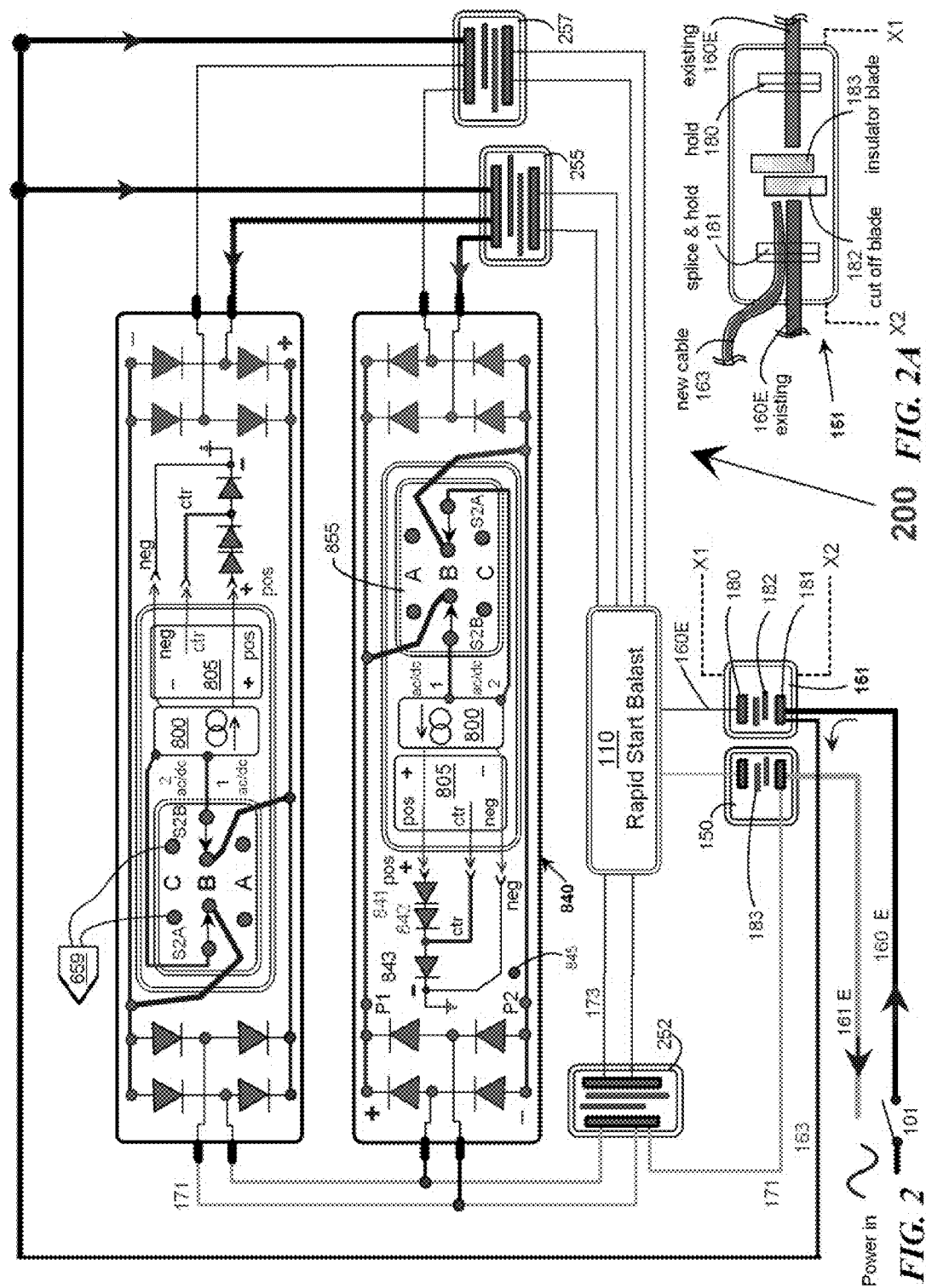

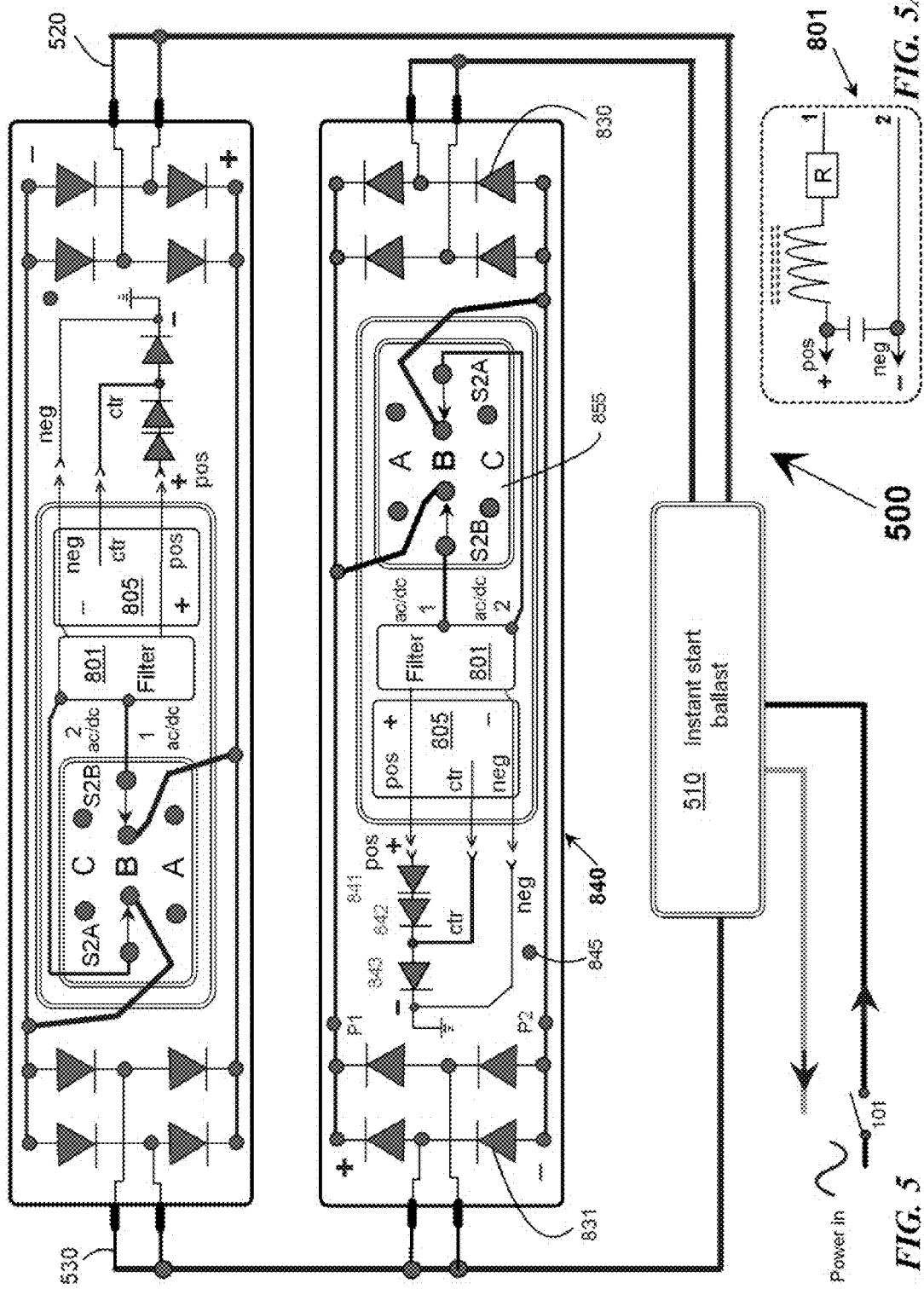

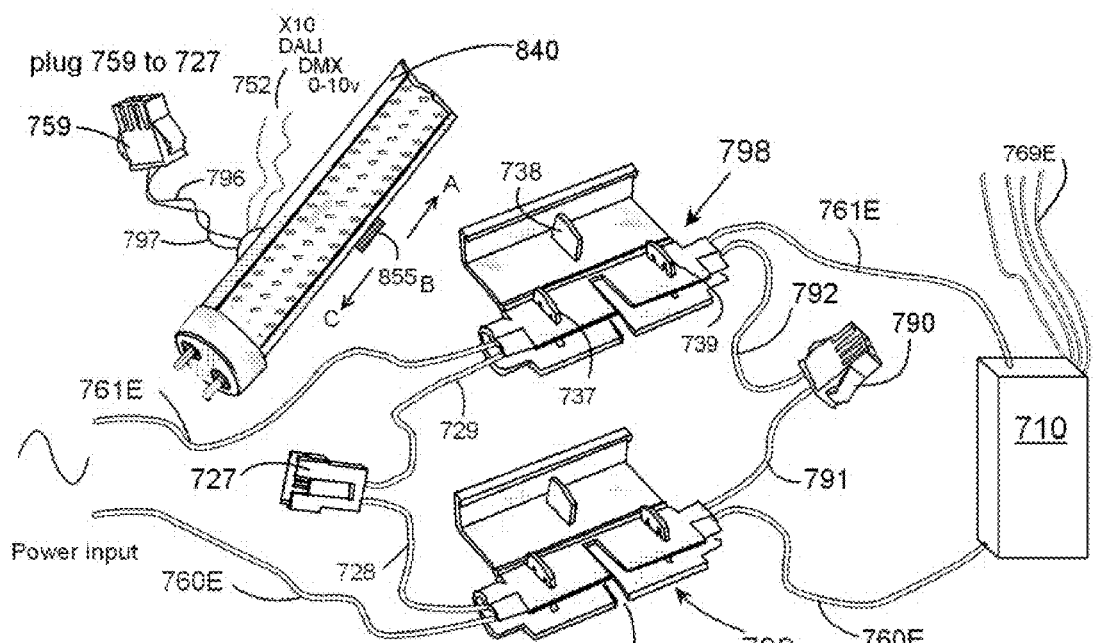
FIG. 7
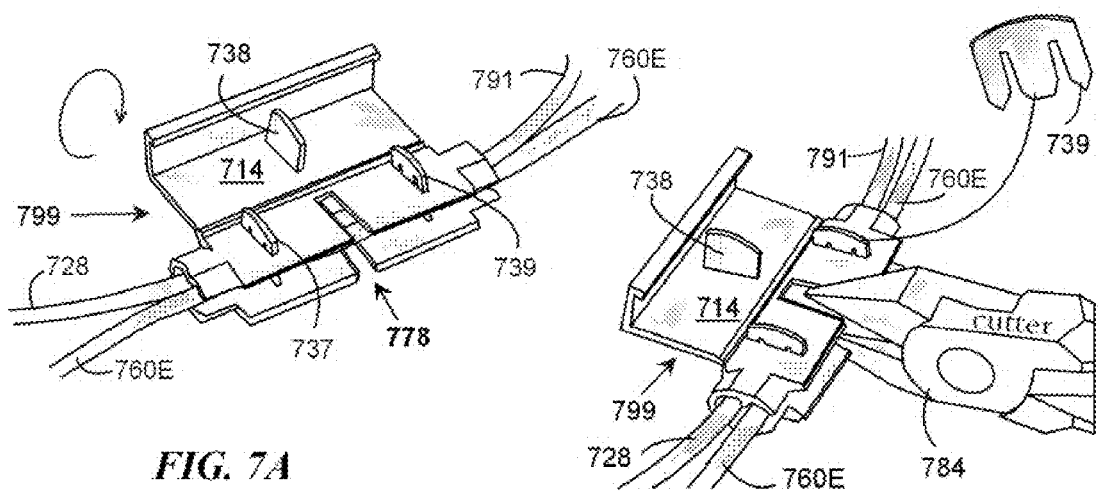
FIG. 7A
FIG. 7B

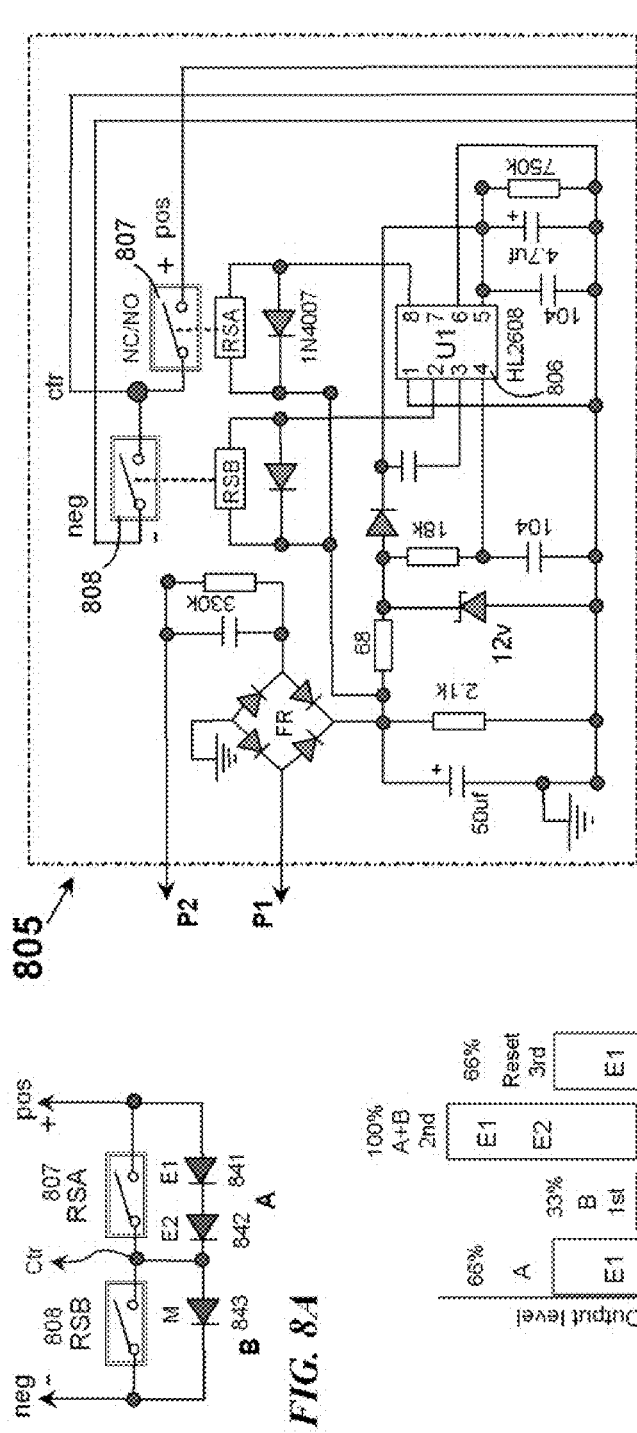
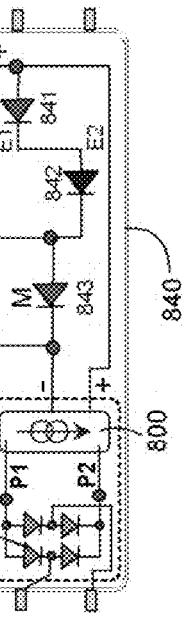
FIG. 8
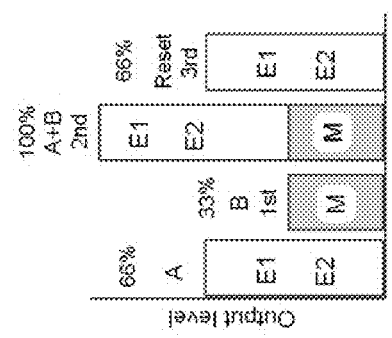
FIG. 8A
FIG. 8B
FIG. 8C

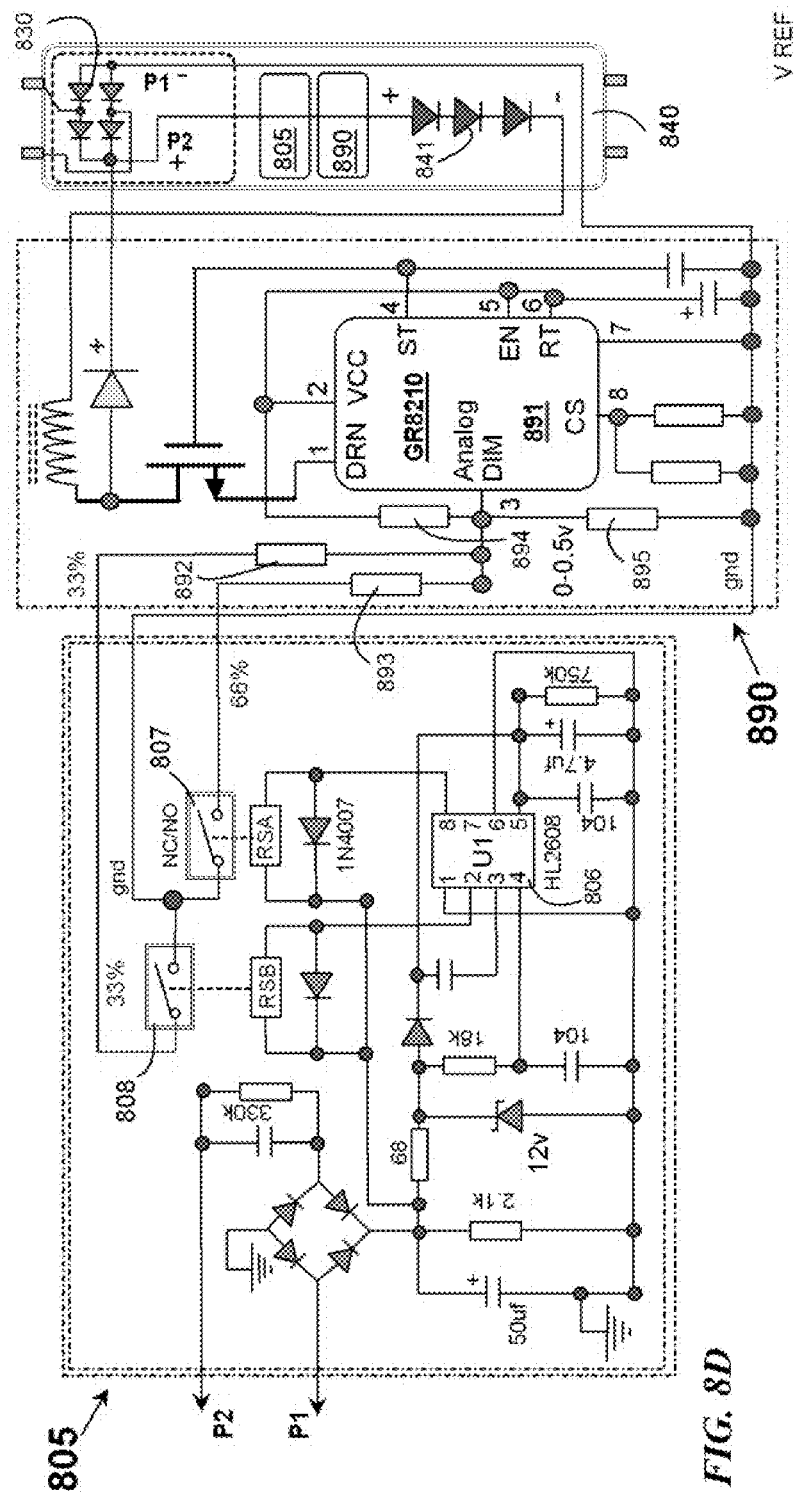
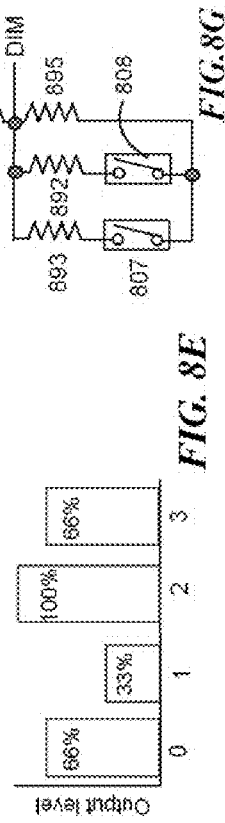
FIG. 8D
FIG. 8E
FIG. 8F
FIG. 8G

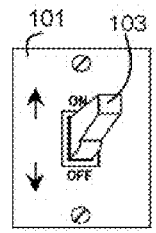 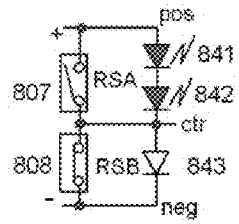 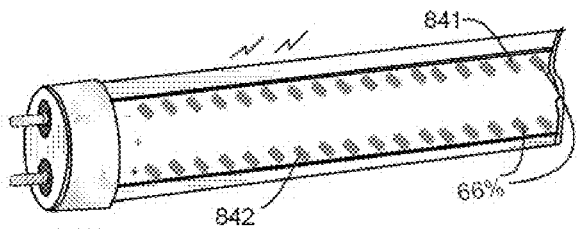
FIG. 9
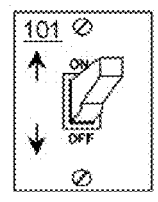 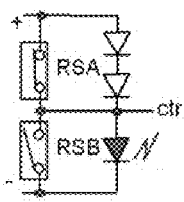 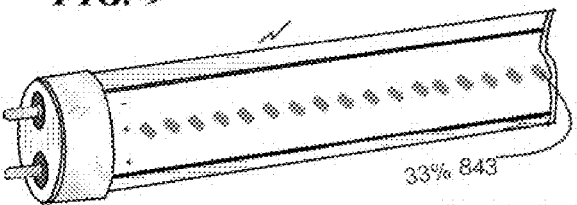
FIG. 9A
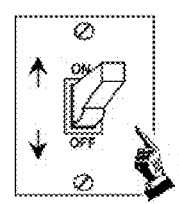 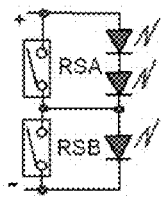 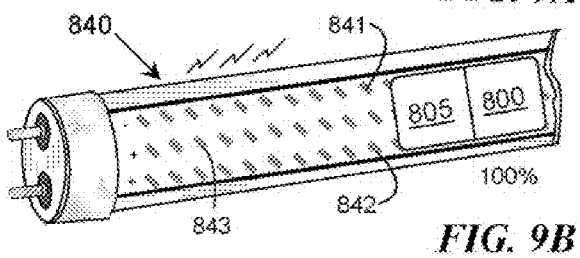
FIG. 9B
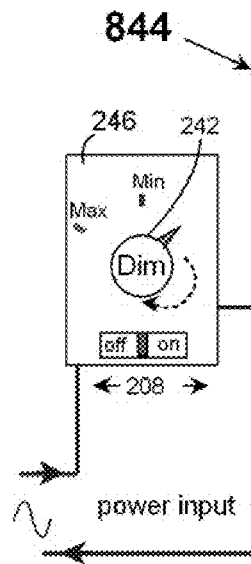 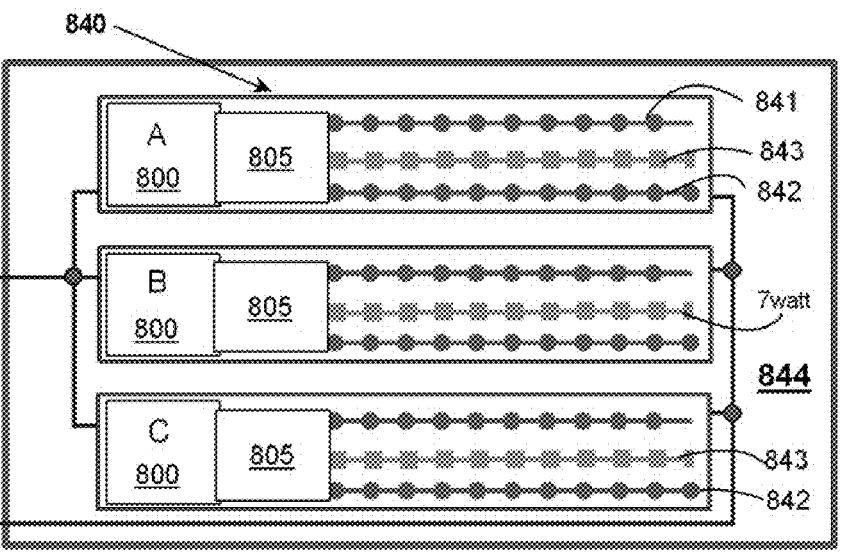
FIG. 10

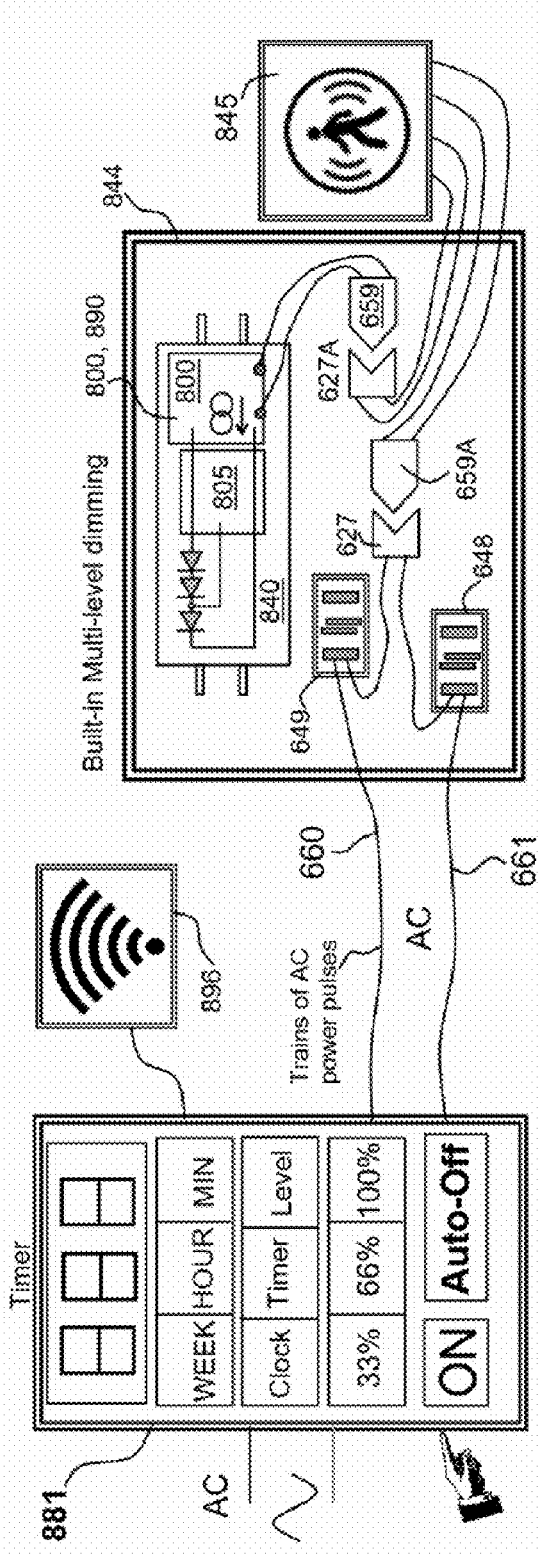

METHOD AND APPARATUS FOR RETROFITTING FLUORESCENT TUBES TO LIGHT EMITTING DIODES

CROSS-REFERENCE TO RELATED APPLICATION

This application claims priority to earlier filed U.S. Patent Application 62/494,942 titled 'Method and Apparatus Retrofitting Fluorescent Tube Lamp to LED,' filed Aug. 27, 2016 by Leo Kwok and Simon Siu-Chi Yu and claims the benefit of the earlier filing date and is incorporated herein by reference in its entirety.

BACKGROUND OF THE INVENTION

In recent years, LED (light emitting diode) lightings have become affordable and energy efficient with improvements and innovation in technology. LED lightings have gained in popularity as a result. More and more consumers and commercial users are changing to ecology friendly LED lighting for its low power and extended operating life.

However, replacing a fluorescent tube from its fixture with a newly bought standard LED tube is not a straight forward process. In most cases, rewiring the existing fixture is required in order to make the replacement. There are many ballast configurations installed on existing fixtures such as a rapid start, instant start ballast, a pre-heated ballast, parallel and series configurations ballasts, etc. that complicate the conversion process. There is no one-tube-fix-all solution available in today's market.

Furthermore, consumers are not typically educated to distinguishing the type of ballast in their lighting fixture. Rewiring is required for single ended input tubes and double ended input tubes fluorescent tubes for conversion to LED lighting. Some LED tubes designed to directly plug into an existing fixture without rewiring may have accidentally been installed on a rewired fixture that can cause burning issue. Rewiring the fixture requires a trained trade person and many home owners are afraid to perform the conversion task themselves. However, it is expensive to hire an electrician to make the replacement of a fluorescent tube to an LED tube.

SUMMARY OF THE INVENTION

A multi-group brightness controllable LED tube comprises a multi-input source selector which directs electric power to the tube from a set of diversion switches inserted between a power source and a preexisting ballast. The diversion switches automatically re-establish new electric current paths to supply the LED tube power and safely bypass the existing ballast. The LED tube also comprises a digital sub section selector for selecting two groups of SMD (surface mounted) LED strip lights for intensity control. When first turned on, the light will be at 66% brightness. A first toggle action dims the light to 33% brightness, and a second toggle action brings it up to 100%. The third toggle will reset the LED tube to 66% brightness. The LED tube is suitable for single end as well as double end fixtures without a complicated conversion process. Furthermore, fixtures can be reverted back to original fluorescent operation.

Other aspects and advantages of embodiments of the disclosure will become apparent from the following detailed description, taken in conjunction with the accompanying drawings, illustrated by way of example of the principles of the disclosure herein.

BRIEF DESCRIPTION OF THE DRAWINGS

FIG. 1 is a type 1 schematic view of retrofitting a rapid start ballast with diversion switches for single end power input LED tubes in accordance with an embodiment of the present disclosure.

FIG. 1A is a perspective view of an open diversion switch in accordance with an embodiment of the present disclosure.

FIG. 1B illustrates new electric current paths when diversion switches are inserted in accordance with an embodiment of the present disclosure.

FIG. 1C is a cutoff blade removed from a diversion switch in accordance with an embodiment of the present disclosure.

FIG. 1D is a splice and hold blade removed from a diversion switch in accordance with an embodiment of the present disclosure.

FIG. 1E is a perspective view of the fold and closed diversion switch in accordance with an embodiment of the present disclosure.

FIG. 2 is a type 2 schematic view of retrofitting a rapid start ballast with diversion switches for a double ended power input LED tube in accordance with an embodiment of the present disclosure.

FIG. 2A is a top internal view of the open diversion switch in accordance with an embodiment of the present disclosure.

FIG. 5 is a type 5 schematic view of retrofitting an instant start ballast for a plug and play LED tube in accordance with an embodiment of the present disclosure.

FIG. 5A is a schematic view of a power frequency filter in accordance with an embodiment of the present disclosure.

FIG. 7 is an alternative designed diversion switch with a cut slot and a revertible plug in accordance with an embodiment of the present disclosure.

FIG. 7A is a perspective view of an alternative designed open view of a diversion switch in accordance with an embodiment of the present disclosure.

FIG. 7B depicts cutting of wires via the diversion switch with a wire cutter according to an embodiment of the present disclosure.

FIG. 8 is a schematic view of a tube that has a digital sub section switch to perform dimming according to an embodiment of the present disclosure.

FIG. 8A is a schematic view connecting a digital sub section switch to control LED light groups according to an embodiment of the present disclosure.

FIG. 8B is a bar graph representation of outputting an LED tube according to an embodiment of the present disclosure.

FIG. 8C is showing a truth table of the digital sub section switch and overall output according to an embodiment of the present disclosure.

FIG. 8D is a schematic of a digital sub section switch designed for an analog voltage dimming of the LED driver according to an embodiment of the present disclosure.

FIG. 8E is an LED tube output level result from the interpretation of a digital section switch according to an embodiment of the present disclosure.

FIG. 8F is a truth table result from the digital section switch according to an embodiment of the present disclosure.

FIG. 8G is an equivalent resistant to voltage divider set from 0-10 volts for dimming according to an embodiment of the present disclosure.

FIGS. 9, 9A, and 9B output of LED tube in response to actions from toggling wall switch according to an embodiment of the present disclosure.

FIG. 10 depicts a typical arrangement of a three lights fixture retrofitted to the disclosed invention according to an embodiment of the present disclosure.

FIG. 13 is a schematic view of an LED light system with automated timer and occupancy sensor control of a light fixture according to an embodiment of the present disclosure.

FIG. 13A is a state diagram of light output pre-programmed from a wall timer according to an embodiment of the present disclosure.

FIG. 13B is a state diagram of light output pre-programmed from a wall timer, but interrupted by manual input according to an embodiment of the present disclosure.

FIG. 13C is a state diagram of light output pre-programmed from a wall timer, but interrupted by occupancy sensor input according to an embodiment of the present disclosure.

Figures 3, 3A:
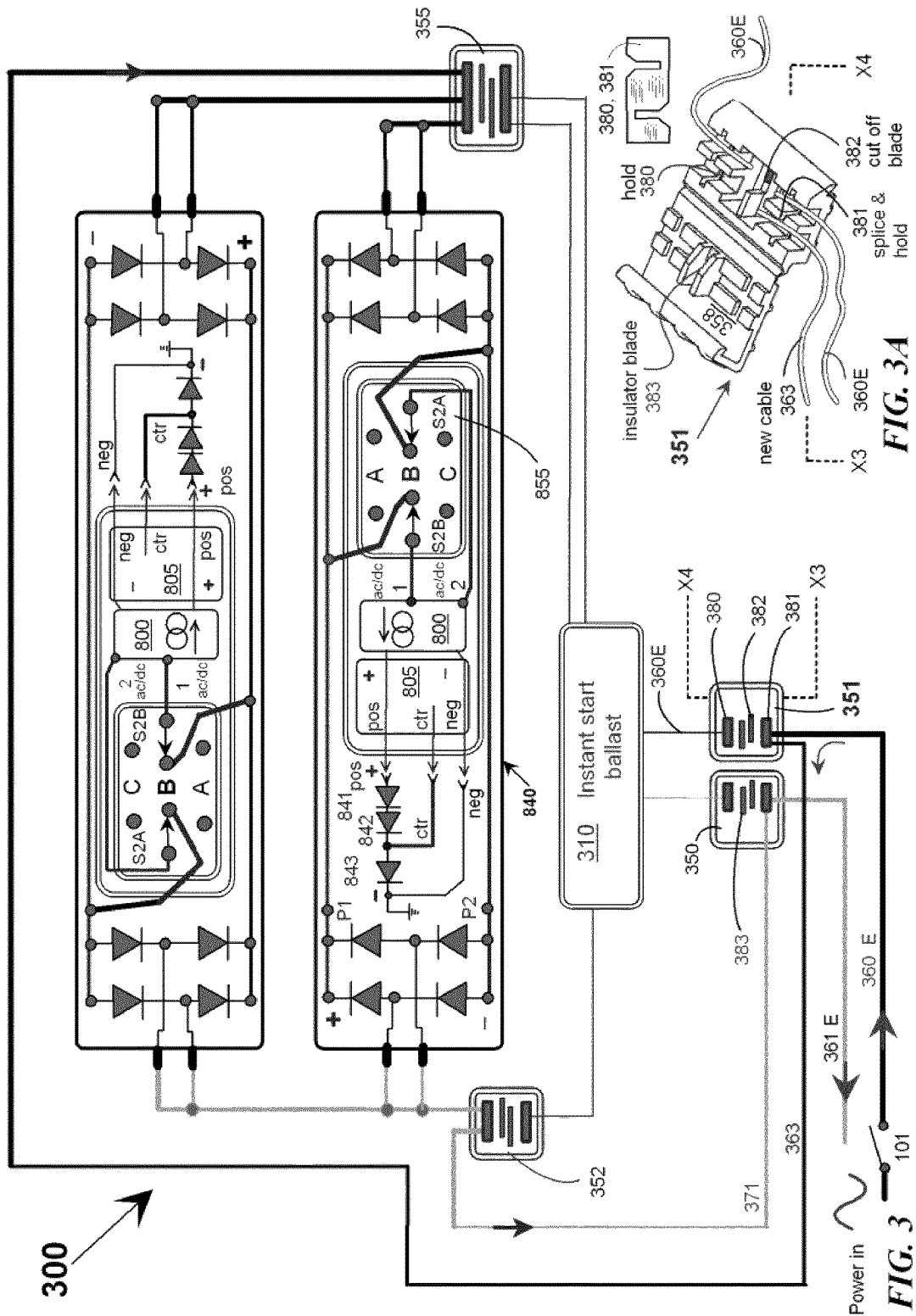
FIG. 3 is a type 3 schematic view of retrofitting an instant start ballast with diversion switches for a double ended power input LED tube in accordance with an embodiment of the present disclosure.
FIG. 3A is a perspective view of an alternative version of an open face diversion switch in accordance with an embodiment of the present disclosure.

Throughout the description, similar and same reference numbers may be used to identify similar and same elements in the several embodiments and drawings. Although specific embodiments of the invention have been illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to a person of ordinary skill in the relevant art and having possession of this disclosure, are to be considered within the scope of the invention.

Throughout the present disclosure, the term "switch" refers to an apparatus which channels electric current based on clamped or crimped connections and/or clamped or crimped open circuits. Also, the term 'diversion' refers to an electrical detour or isolation from a prior existing electrical path. Therefore a diversion switch provides an electrical diversion from a prior electrical path. The term, "clamped' or 'crimped' refers to a mechanical connection necessary for electrical conduction to occur. In the context of the present disclosure, the closing of a lid of a diversion switch having cutting blades therein creates a crimping or a clamping of wires to the blade and electrical connection thereto as a result of the mechanical action.

The present disclosure uses a set of diversion switches adapted to eliminate the expensive, tedious and labor intensive retrofit processes. The disclosed diversion switches are adaptable, easy to apply and save time. Another aspect of the disclosure includes a feed selection switch adapted to accept most fixtures for conversion to single end tube or double end tube power input. The feed select switch insures safety for the installer during tube replacement. Minimal hand tools and electrical accessories are required for retrofitting the disclosed LED lighting tube.

Another aspect of the disclosure includes a digital sub-section switch designed to perform dimming particularly useful for Plug and Play LED tubes shown on type 4 and type 5 of the disclosed drawings. Present technology of dimming plug and play LED tube is not possible by using a conventional phase cutting dimmer switch and non-dimming ballast. The digital sub-section switch enables any fixture to be dimmed, including type 1 to type 6 fixtures in the present disclosure. The digital sub-section switch allows multiple location dimming of three way light switches without a phase cut dimmer. The digital sub-section switch converts digital pulses to analog voltages in the range 0-10 volts and more for control of an LED driver. The digital sub-section switch eliminates two externally wired low voltage control cables required for 0-10 volt conventional dimming.

Still another advantage of the disclosure is a utilization of a digital sub section switch to interpret control signals generated from an automated wall timer switch. The wall timer switch is programmed per time and light intensity to schedule on and off as well as light intensity.

Yet another advantage of the disclosure is an occupancy sensor. The occupancy sensor generates coded power pulse trains to let the digital section switch to determine the correct light intensity. Another advantage of the disclosure is a diversion switch shown on type 6 combined with a pins bypass tube that can be reverted back to the fluorescent tube operation.

FIG. 1 is a type 1 schematic view of retrofitting a rapid start ballast with diversion switches for a (single end) power input LED tube in accordance with an embodiment of the present disclosure. A type 1 rapid start ballasted fixture 100 is retrofitted with an LED tube 840 depicted getting electrical power (single end) with help from a set of diversion switches 150 and 151. The diversion switches 150 and 151 are inserted between utility power wires causing existing wires 160, and 161 to be separate from ballast 110. The switches 150 and 151 provide two new wires 163 and 171 coupled to two secondary diversion switches 155, and 157. The inserted secondary diversion switches 155 and 157 also provide two new wires that couple to the pins of LED tubes 840. The ballast is now isolated from electrical power and the pins of the LED tube 840. The tube 840 comprises isolation diode sets 830 and 831 that provide an electrical guard for installer safety when tube 840 is being replaced. A feed select switch 855 is provided for selection of electrical power input sources and provides an extra safety measure for the installer. The switch 855 has three positions. The switch 855 is placed on (A) position during installation, and then slides to (B) for normal operation. This measure assures an installer will not receive an electric shock during reinstallation of the new LED tube 840.

After the correct power source is selected from electrical power feed select switch 855, raw power then goes into a constant current LED driver 800, and then delivered to an optional (digital sub section switch) dimming switch 805 for controlling the brightness of tube 840. The dimming switch 805 is optionally made of a plug-in module. The tube 840 can operate to its full brightness without the dimming module 805. It is beneficial to include the module 805 for better control of light quality and to enhance lighting efficiency.

FIG. 1A shows an open diversion switch 151 that includes cutting blade 182 according to an embodiment of the present disclosure. When the blade 182 is clamped or crimped, wire 160 is separated from ballast 110. When the blade 181 and 180 are clamped or crimped via closing a lid of the switch, the switch 151 is secured on an exit side of wire 160 and blade 181 splices through primary side of wire 160 and creates a new current path to wire 163. On schematic page 7 of 16, FIG. 1B illustrates that new current path 174 is created with the inserted diversion switch 151, through the secondary diversion switch 155, terminated at wire 164. The old current path that was using wire 160 and 164 is no longer active, represented with the cutter 102. There is a perspective view of cutoff blade 182 removed as shown on FIG. 1C, and a splice and hold blade 180, 181 removed as shown on FIG. 1D removed from a diversion switch. When finished with clamping, the diversion switch 151 is closed with its lid 158 closed forcing the isolator blade 183 further separating the wires cut ends 160, 161 as shown on FIG. 1E according to an embodiment of the present disclosure.

FIG. 2 is a type 2 schematic view of retrofitting a rapid start ballast with diversion switches for a double ended power input LED tube in accordance with an embodiment of the present disclosure. A type 2 rapid start ballasted fixture 200 retrofitted with LED tube 840 depicted gets electrical power from a (double end) set of diversion switches 150, 151, 252, 255 and 257. The switches 150 and 151 inserted in the electric power supply circuit causes existing wires 160, and 161 to be separated from ballast 110. The secondary diversion switches 252, 255, and 257 serve the same function as described in FIG. 1. The type two retrofit schematic allows direct electrical power supply from the wires 160 and 161 and a diversion or isolation from the rapid start ballast 110.

A top open cartoon view shows the wire connections of diversion switch 151 shown in FIG. 2A according to an embodiment of the present disclosure. The splice and hold blades 180 and 181 also provide electrical connection between the two wires 160 and 163. The cutoff blade and the insulator blades provide isolation between the two sides of existing wire 160 between the entrance chamber and the exit chamber. The clamped body of the diversion switch itself also provides insulation to the installer from electrical shock to the spliced wires.

FIG. 3 is a type 3 schematic view of retrofitting an instant start ballast with diversion switches for double ended power input to the LED tube according to an embodiment of the present disclosure. A type 3 instant start ballasted fixture 300 retrofitted with LED tube 840 depicted gets electrical power from a double end with a set of diversion switches 350, 351, 352, and 355. The switches 350 and 351 inserted in the electrical power supply circuit causes existing wires 360, and 361 to be separated from ballast 310. The switches 352 and 355 serve the same function as described in FIG. 1. The type 3 retrofitting circuit is similar to the type 2 retrofitting circuit with the exception that it uses one less diversion switch than the type 2 system.

FIG. 3A depicted an alternative open face style division switch in accordance with an embodiment of the present disclosure. The switch 351 serves the same function as described on FIG. 1A with exception the wires are assembled with its lid 358 open and using a S-shaped splice blade for easy access. The lid 358 has a hook like elongate edge which fastens around a complementary elongate edge of the diversion body to form a tight and secure closure thereof. Also, the crenellations depicted on an underside of the lid 358 help to secure and lock the wires in place by providing mechanical friction there between.

Figure 4:
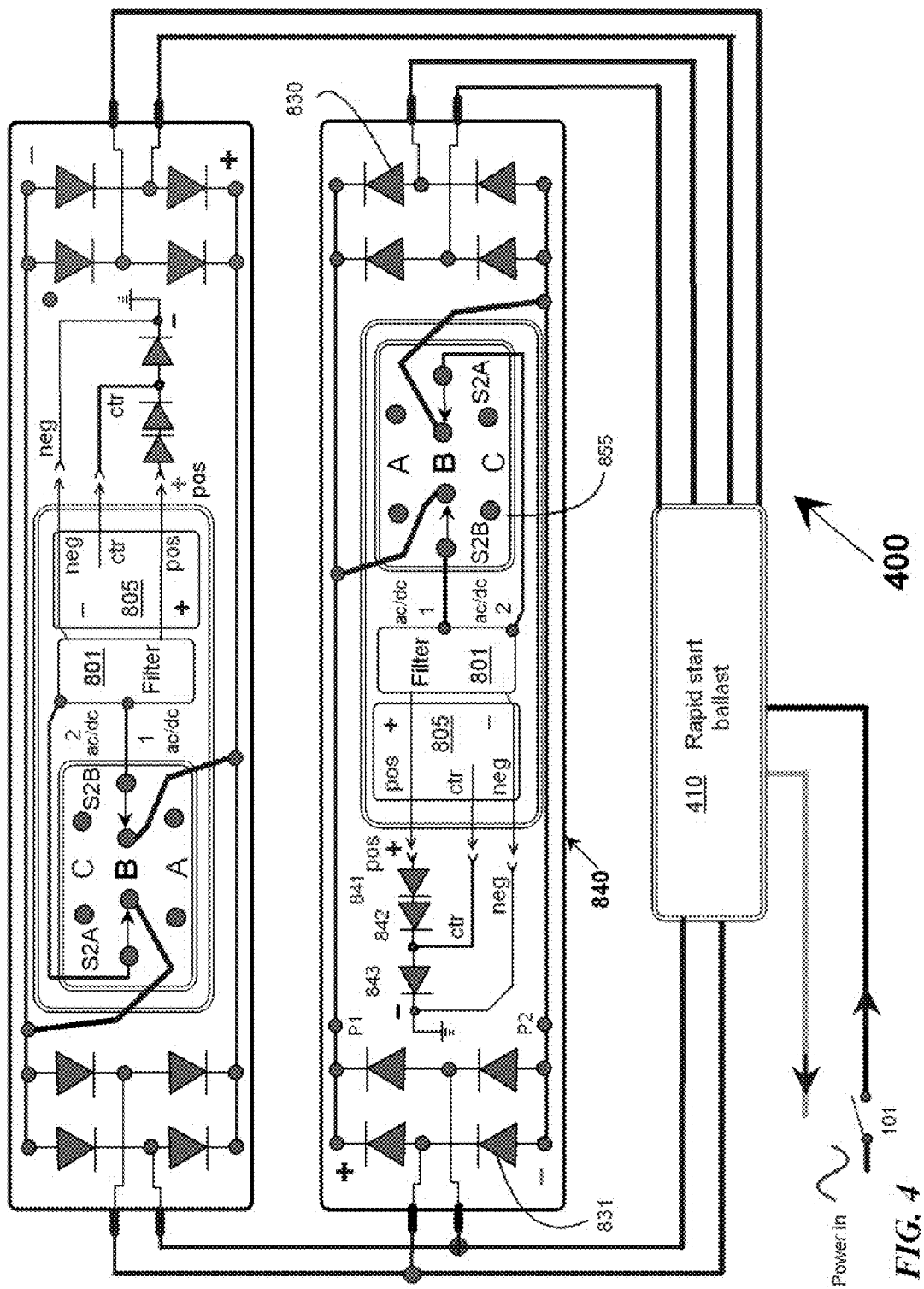
FIG. 4 is a type 4 schematic view of retrofitting a rapid start ballast for plug and play LED tube in accordance with an embodiment of the present disclosure.

FIG. 4 is a type 4, rapid start ballasted fixture 400 schematic view for plug and play LED tubes in accordance with an embodiment of the present disclosure. Its ballast 410 is being reused for electrical power in the new LED tube 840. The tube 840 comprises a set of isolation diodes 830, and 831 configured to prevent electric shock to an installer. Furthermore, the feed select switch 855 reinforces the safety measure by pre-switching to position (A) during installation. Optional dimming module 805 is also provided if needed. The LED driver 800 as shown in FIG. 1 is replaced with a power frequency filter network 801 shown on FIG. 5A since there is no need for driver 800 for a plug and play LED tube.

FIG. 5 is a type 5 schematic view of retrofitting an instant start ballast for a plug and play LED tube in accordance with an embodiment of the present disclosure. Type 5 is depicted by an instant start ballasted fixture 500. Its ballast 510 is being reused to power the new LED tube 840. The tube 840 comprises a set of isolation diodes 830, and 831 configured to prevent electric shock to installer. Furthermore, the feed select switch 855 reinforces the safety measure by pre-switching to position (A) during installation. Optional dimming module 805 also provided if needed. The LED driver 800 as shown in FIG. 1 is replaced with power frequency filter network 801 since there is no need for driver 800 for a drop in plug and play LED tube. FIG. 5A depicts a schematic view of an RLC power frequency filter network 801 to remove unwanted electrical noise according to an embodiment of the present disclosure.

Figures 6, 6A:
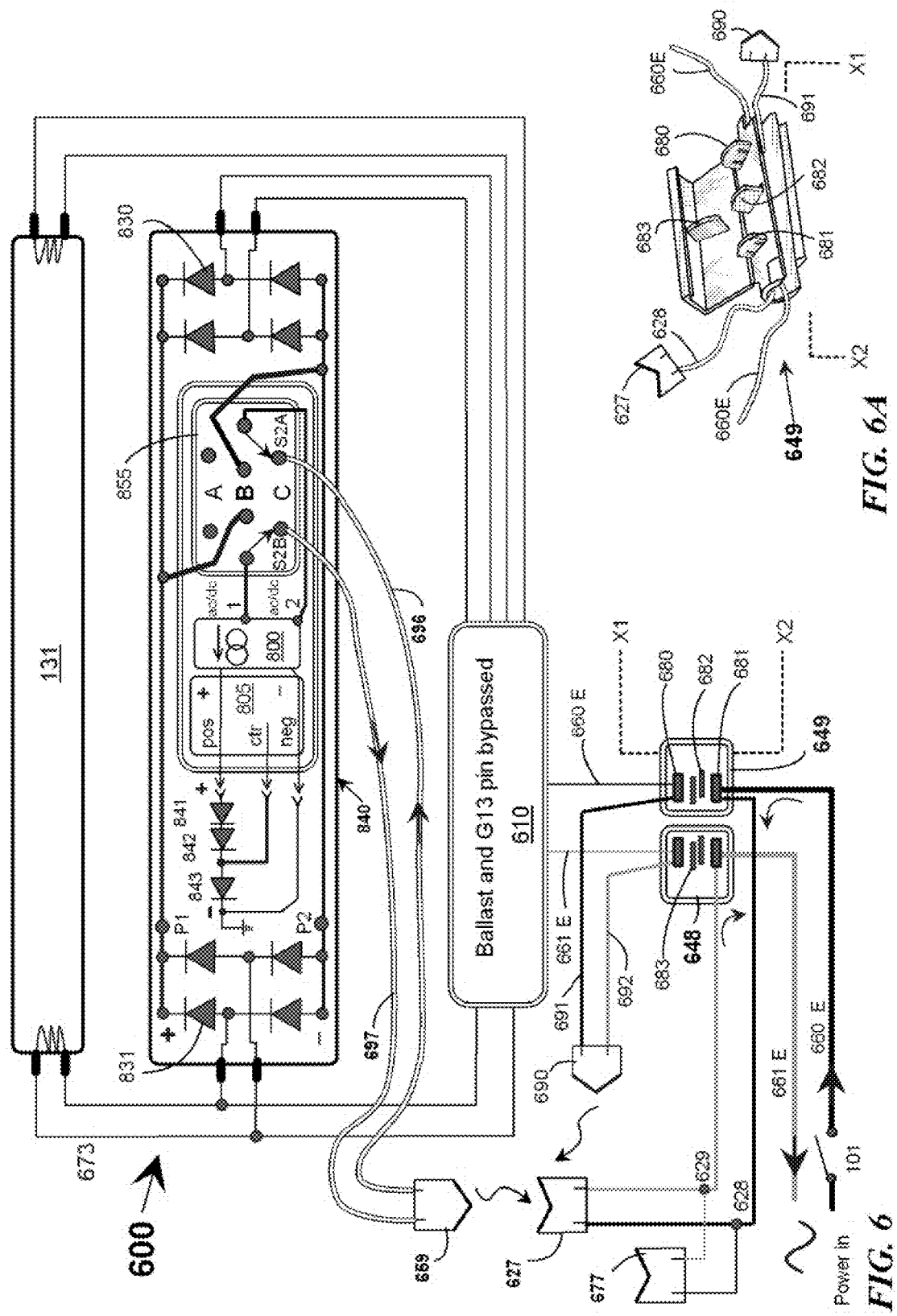
FIG. 6 is a type 6 schematic view of retrofitting any ballasted fixture to operate an LED tube revertible back to its original fluorescent operation in accordance with an embodiment of the present disclosure.
FIG. 6A is a perspective view of the open diversion switch in accordance with an embodiment of the present disclosure.

FIG. 6 is type 6 schematic view of retrofitting any ballasted fixture to operate an LED tube convertible back to its original fluorescent operation in accordance with an embodiment of the present disclosure. Type 6 is referenced as retrofit system 600. Any type of pre-installed ballast fixture is able to be retrofitted with LED tube 840 as shown in FIG. 6 powered electrically from a set of diversion switches 648, and 649. The switches 648 and 649 inserted in the electrical power supply circuit causes existing wires 660, and 661 to be separated from ballast 610. The switches 648 and 649 provide two new wires 628, and 629 to couple to power out sockets 627, and 677. Power pickup plug 659 further comprises power pickup wires 696, and 697 connected to (C) position of feed select switch 855 in tube 840. The ballast 610 is now isolated from electrical power and all pins of the LED tube 840 as well. The tube 840 comprises isolation diode sets 830 and 831 that guard and provide for installer safety when the tube 840 is being replaced. Feed select switch 855 functions to select proper power input sources and provides an extra safety measure for installer. The switch 855 is placed on (A) position during installation, and then slides to (C) when installation is completed. This measure assures an installer will not receive an electric shock during reinstallation of the new LED tube 840 as disclosed herein. The power pick up plug 659 may be connected to the input side of the diversion switches 648 and 649 via the power out sockets 627 or 677. A second LED tube is shown in simple relief as 131 with impedance inputs on a supply side 673 and a ballast side.

FIG. 6A still shows the wires on the secondary side of ballast 610 connected to tube 840. With the isolation diode sets 830 and 831 in reverse bias, an electric current flow outside the tube 840 is prevented for safety to the installer. Furthermore there is a revertible plug 690 connected with wire 691, 692 to the switch 648, 649. The plug 690 is to be mated with socket 627 based on reverting the fixture 600 back to its original fluorescent operation and effectively provide a short circuit around the diversions switches. FIG. 6A shows a diversion switch 649 in open view consisting of power socket 627 and revert power pickup plug 690 in accordance with an embodiment of the present disclosure.

Also in reference to FIG. 6 all tube pins may be bypassed in a type 6 configuration. There are many configurations possible, but bypassing the existing tube pins provides certain benefits to retrofitting T-8 tube using just two diversion switches. The tube pins become dummy pins which don't receive electric power but remain for physical holding purposes in a light fixture. The LED tube includes cables 696 and 697 connected to a plug 659 which mates to socket 627 for power in an embodiment of the present disclosure.

Turning to FIG. 7, an alternative design of a slotted diversion switch with a cut slot and a revertible plug are depicted in accordance with an embodiment of the present disclosure. The diversion switches 798, and 799 provide a cut slot 778 for cutting wires 760, or 761 for open connections instead of using cutoff blades 182 as shown in FIG. 1B. Isolation blade 738 still provides electrical isolation of the wires in the diversion switch. The switch further includes power output socket 727 configured to mate to LED tube 840 power input plug 759 via wires 796, 797 and internally terminates on (C) position of feed select switch 855. The diversion switches 798, and 799 further include a revert plug 790 and wires 791, and 792 reserved for future use in the event the lamp tube fixture needs to be reverted back to its original fluorescent tube configuration.

FIG. 7A is a perspective view of an alternative designed slotted diversion switch 799 with splice and hold blade 737 and 739 in accordance with an embodiment of the present disclosure. An isolator blade 738 pushes away all ends of wires 728, 760, 791 when the lid 714 is closed. FIG. 7B is a depiction of cutting wires held secure in the diversion switch via a wire cutter 784 in accordance with an embodiment of the present disclosure. Slotted blade 739 is configured with one way facing crenellations to cut and hold the wires inside the diversion switch. The blades may be crimped onto the wires prior to the lid 714 being latched closed against the body. Alternatively, closing the lid 714 may also accomplish a clamping or crimping of the blades onto the wires.

FIG. 8 is a schematic view of an LED tube 840 with its internal optional dimming (digital sub section switch) 805 module enlarged to show its construction in accordance with an embodiment of the present disclosure. The LED tube is operated with constant current driver 800. The equivalent circuit is depicted on FIG. 8A including a digital subsection switch configured to control LED light groups according to an embodiment of the present disclosure. The tube 840 is divided into two lighting groups. (A) group consists of an edge placed LED diode 841, and 842. (B) group consists of a middle placed LED diode 843. FIG. 8B is a bar graph representation of output from an LED tube in accordance with an embodiment of the present disclosure. The output level varies from a B first level of 33% and an A level of 66% and a 100% level comprising E1, E2 and the middle diode or levels A+B with respect to the center reference between RSA and RSB. A reset level of 66% across E1 and E2 is achieved in a reset third level.

Module 805 has a digital counter 806 that monitors and registers loss of power for an event. Therefore when someone toggles wall switch 101, it will cause the counter 806 to change state as shown in truth table on FIG. 8C in accordance with an embodiment of the present disclosure. Every time when power loss is detected, either relay switch 808, or 807 will close but it never happens with both relays 808,807 are closed at the same time. The module 805 can be unplugged if the dimming function is not required.

We return to FIG. 8A to explain dimming with digital sub section switch 805. When power is initially turned on, relay 808 is closed, effectively shorting out middle group LED 843 which goes dark as indicated on FIG. 8B brightness chart indicated schematically in FIG. 9. To change brightness, one simply toggles wall switch 101, relay switch 808 opens and relay switch 807 closes and shorts out edge groups 841 and 842 and the LED goes dark. The tube 840 brightness chart shows it dropping to 33% as indicated schematically on FIG. 9A. Repeating another toggle action will open both relay 807 and 808 to obtain 100% full brightness as shown in FIG. 8B and schematically in FIG. 9B. One more toggle action will reset the counter 806 to cause 66% brightness output indicated on FIG. 9B. FIG. 8C is a truth table depiction of the digital sub section switch and overall output in accordance with an embodiment of the present disclosure.

FIG. 8D is a schematic of a digital sub section switch adapted to convert to analog voltages the dimming of the LED driver in accordance with an embodiment of the present disclosure. An analog 0-10 volt dimming diagram depicted utilizes digital sub section switch 805 to open or close the relay contact 807 or 808. The closing of the relay contacts changes the resistance voltage dividers 892, and 893 per voltages established on FIG. 8G. The resultant voltage is reflected on dim input pin 3 of LED power driver 891 used to set the output current via pulse width modulation switching. Analog dimming circuit 890 in the present invention uses power driver GR8210 for power output. Other power devices, such as the HV9910 are also suitable.

FIG. 8E is a graphical depiction of LED tube output level resulting from the application of the digital section switch according to an embodiment of the present disclosure. Output levels can be set by the resistor values 893, and 892 shown for 4 circuits according to an embodiment of the present disclosure. FIG. 8F illustrates the truth table of the digital section switch 805 also in accordance with an embodiment of the present disclosure. FIG. 8G is an equivalent resistance to voltage divider circuit. Voltage can set from 0-10 volt for dimming according to an embodiment of the present disclosure.

A typical three light arrangement using three LED tubes 840 in one fixture is shown in FIG. 10 in accordance with an embodiment of the present disclosure. The tubes 840 are equipped with dimming module 805 that work the same way described in FIG. 8. This layout is more desirable than conventionally using two sets of (AB) toggle switches that create a blackout section when only one toggle switch is active.

Figure 11:
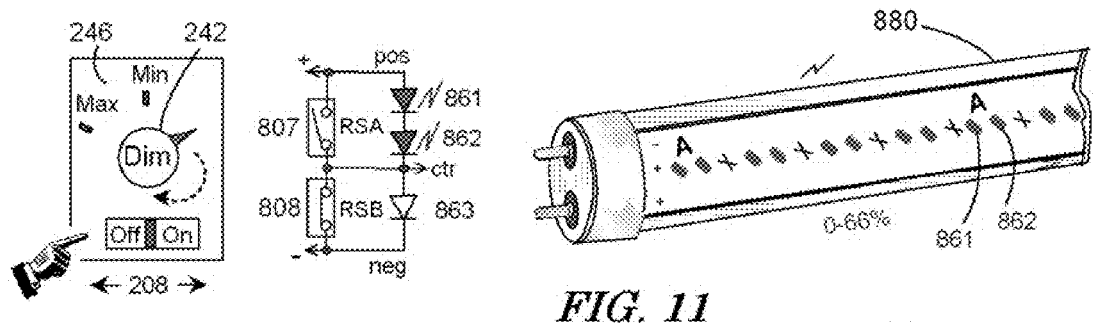
FIGS. 11, 11A and 11B depict an output of an LED tube in response to actions from toggling a wall switch according to an embodiment of the present disclosure.
Figure 11A:
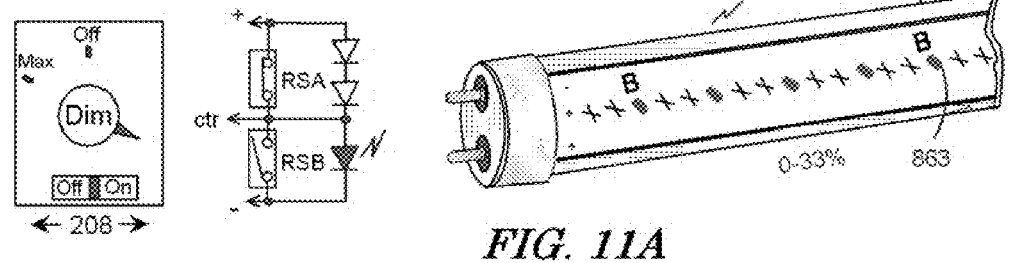
Figure 11B:
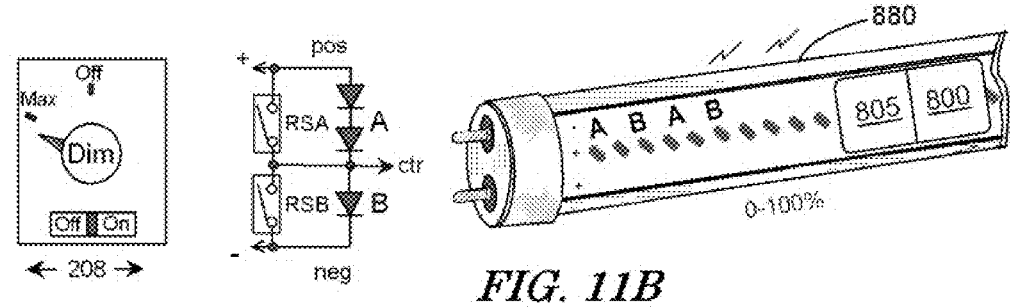
Figure 11C:
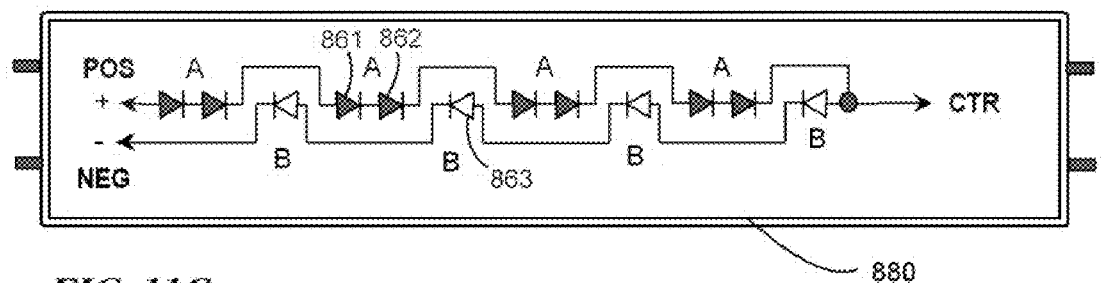
FIG. 11C is alternative LED SMD (surface mount device) arrangement in one row instead of the three shown in FIG. 9 according to an embodiment of the present disclosure.

FIG. 11 depicts an alternative low cost designed LED tube 880 in a first toggle switch configuration according to an embodiment of the present disclosure. The SMD (surface mount device) LED consist of two groups: (A) group 861, and 862 and (B) group 863 are all arranged in one row shown schematically in FIG. 11C according to an embodiment of the present disclosure. The dimming method is identical to that described in FIG. 8, with the only difference in the physical layout of the SMD LED. Shown in FIG. 11 is only group (A) turned on to achieve 66% brightness, and 33% brightness shown in FIG. 11A. FIG. 11B shows 100% full brightness in accordance with an embodiment of the present disclosure.

Figure 12:
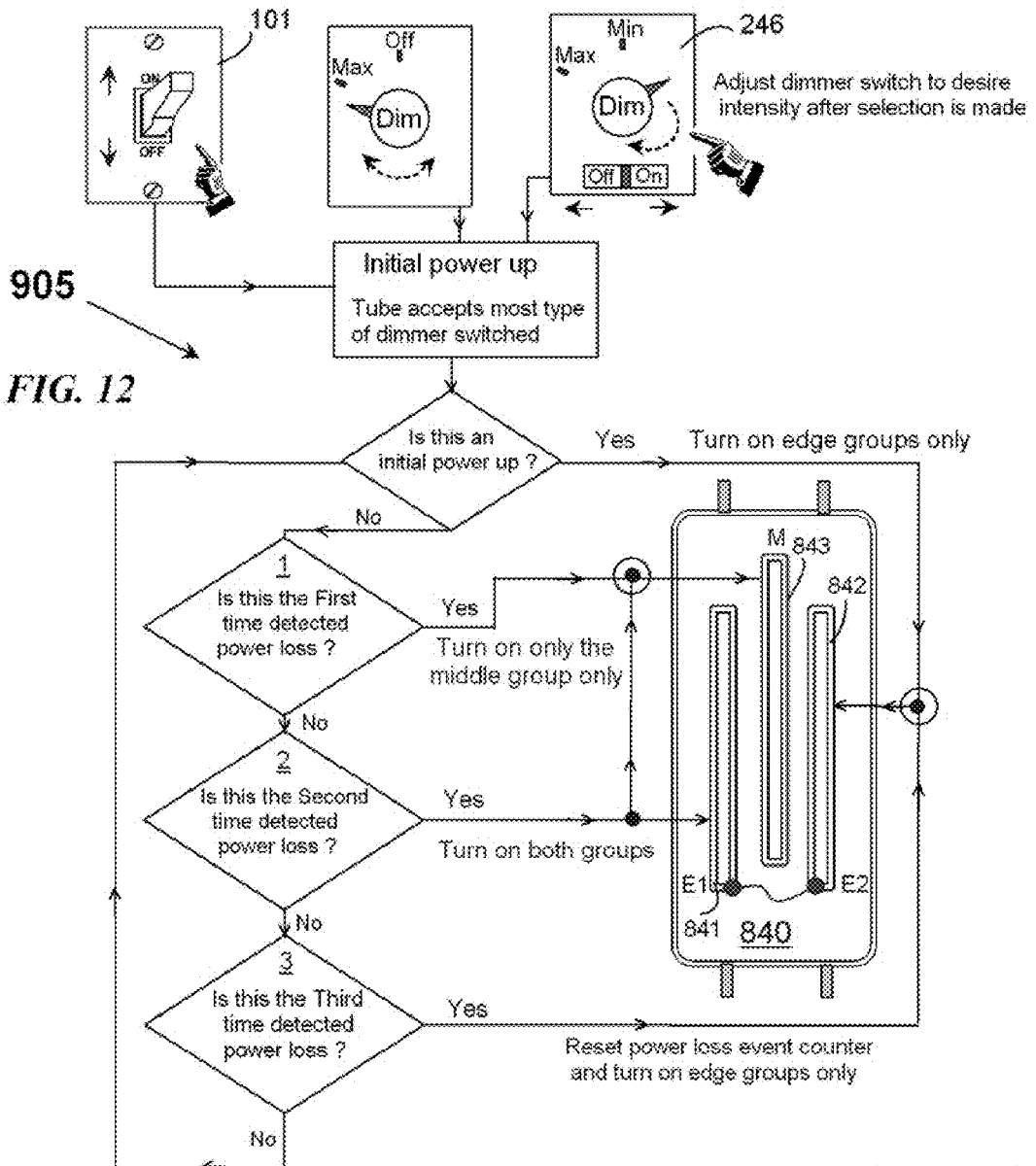
FIGS. 12, 12A and 12B depict flow charts showing a dimming sequence according to an embodiment of the present disclosure.
Figure 12A:
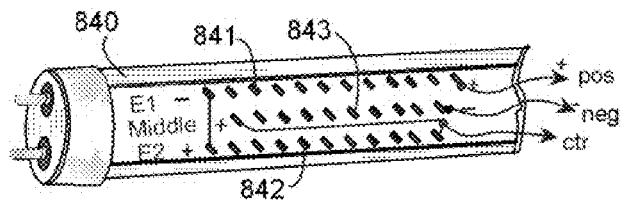
Figure 12B:
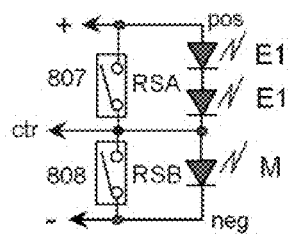

FIG. 12 is a flow chart of the retrofitting system 905 dimming sequence according to an embodiment of the present disclosure. A tube 840 in FIG. 12A shows wire connections that correspond to FIG. 12B with the LED 841, 842 and 843 as well as relay switches 807,808. FIG. 12B is an equivalent circuit schematic for the voltage divider across a positive and a negative voltage with respect to the center node 'ctr.' Switches 807 and 808 are both open so voltages are seen across respective LED E1, E2 and M.

FIG. 13 is a schematic view of an LED light system with automated timer and occupancy sensor control of a light fixture in accordance with an embodiment of the present disclosure. A complete setup of an automatic timer wall switch 881 with connected Wi-Fi module 896 controls the LED tube 840 with optional occupancy sensor 845. The timer switch 881 delivers trains of pulses by rapidly opening and closing its internal relay. The pulses are picked up by the digital sub section switch 805 causing a dimming effect on the LED tube 840. Other technologies such as X10, Z-wave, ZigBee and the like can be used in connecting timer 881 and tube 840 shown on FIG. 7. A sample of a preprogrammed graphic representation of timer 881 is shown on FIG. 13A according to an embodiment of the present disclosure. FIG. 13B is a controlled graphic representation of timer 881 interrupted by manual override in accordance with an embodiment of the present disclosure. An occupancy sensor 845 also interrupts the timer 881 pre-programmed schedule shown on FIG. 13C in accordance with an embodiment of the present disclosure.

Figures 14, 14A:
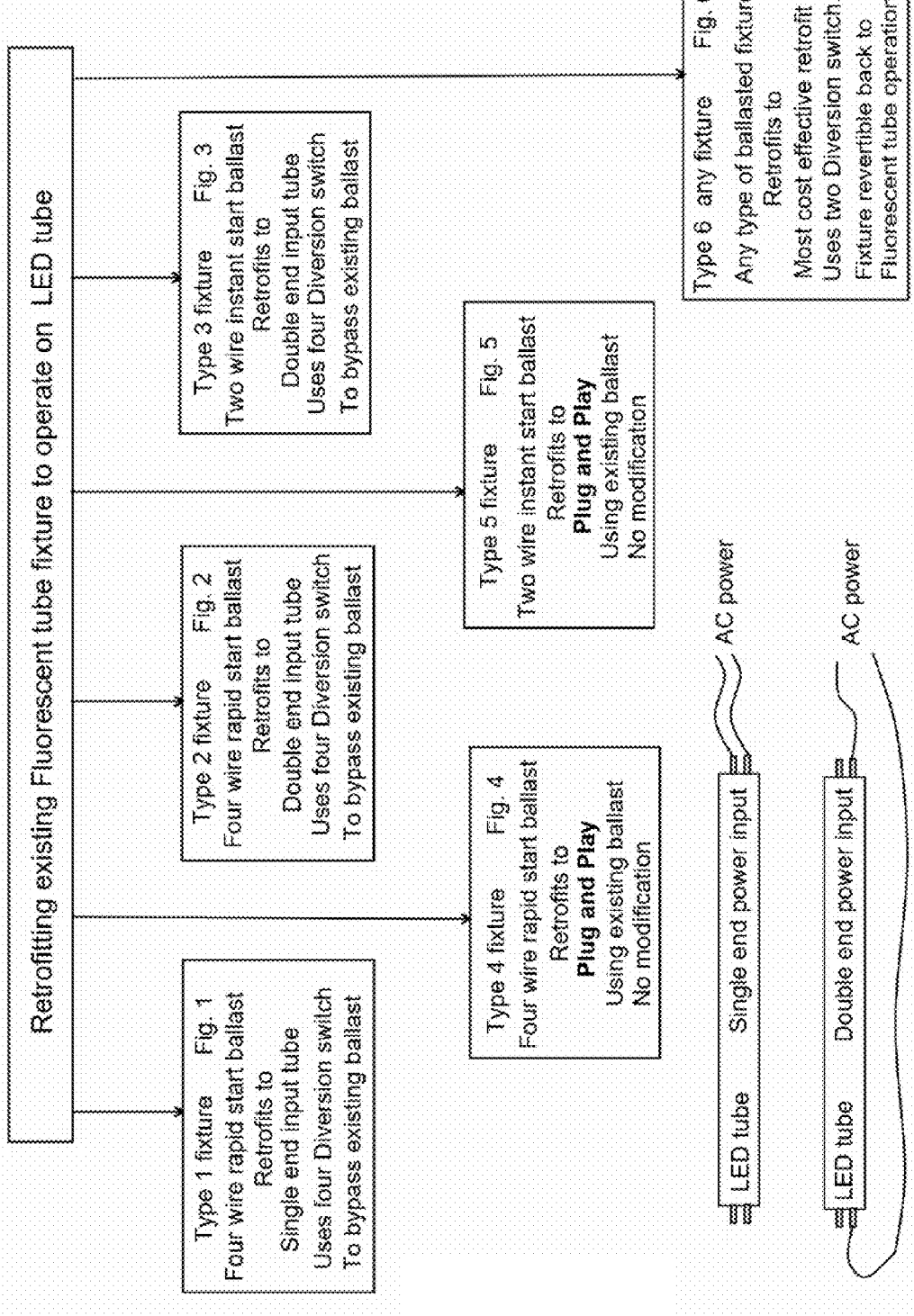
FIG. 14 depicts LED tubes designed to suit six different types of retrofit configurations according to an embodiment of the present disclosure.
FIG. 14A depicts a retrofit to single and double end LED tubes according to an embodiment of the present disclosure.

Turning to FIG. 14, a summary of six types of fluorescent tube retrofit with the LED tube 840 proposed in accordance with an embodiment of the present disclosure. Type 1, 2, and 3 require a bypass of the existing ballasts, and thus require using four diversion switches. Types 4, and 5 are one to one replacement plug and play, and therefore do not required bypassing respective ballasts.

Type 6 bypassing everything by two simple diversion switches 648, and 649 while reserving the feature to revert back to its original fluorescent tube operation. Two basic ballast bypassing configurations are depicted on FIG. 14A including a single and double ended power supply LED tube in accordance with an embodiment of the present disclosure.

Figure 15:
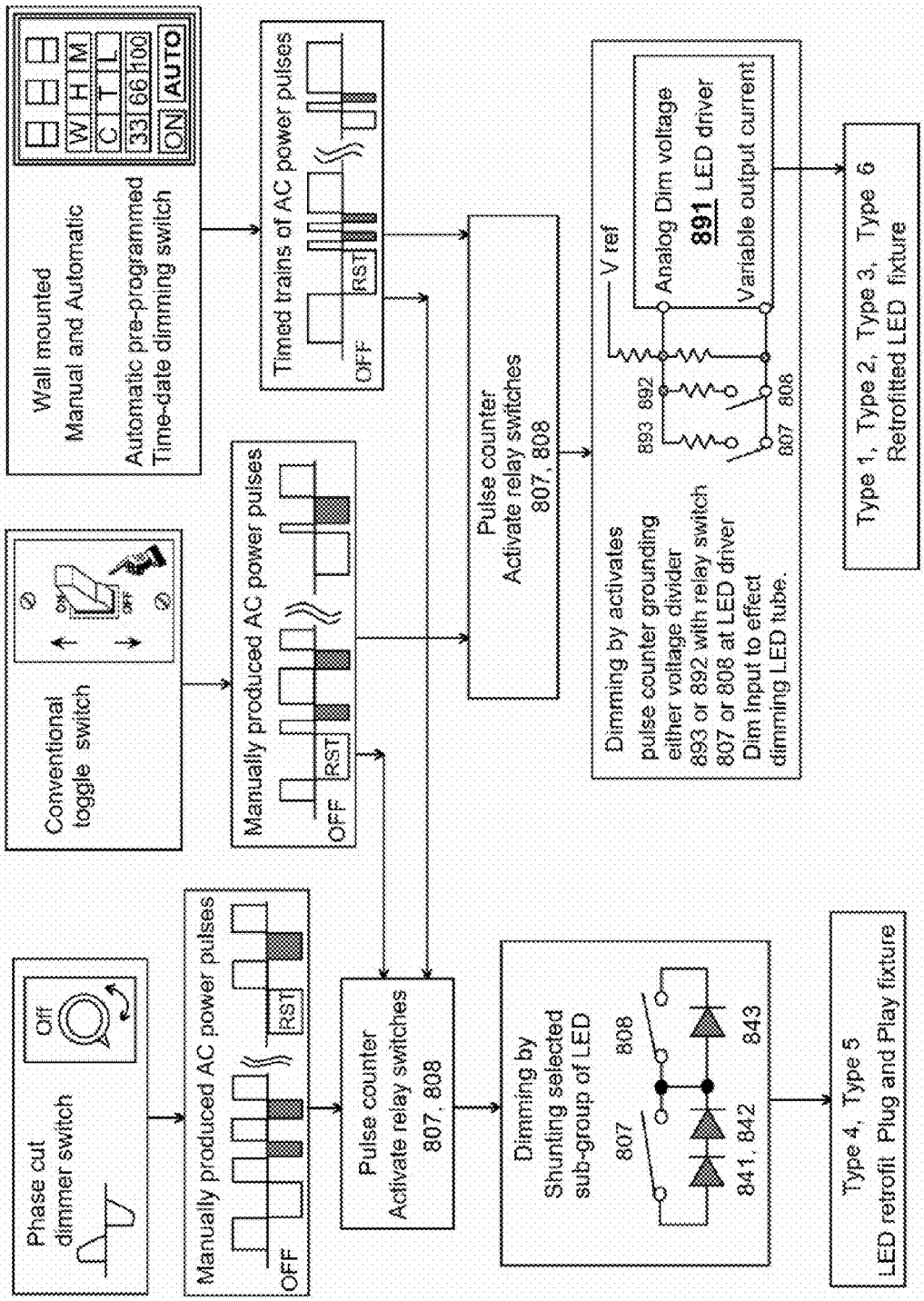
FIG. 15 shows various methods for dimming control manually and automatically according to an embodiment of the present disclosure.

FIG. 15 depicts a synthesized method of manual and automatic control of LED light dimming in accordance with an embodiment of the present disclosure. Types 4, and 5 are shown dimmed by a rotary phase cut dimmer, or a regular toggle wall switch as well as a programmed timer switch. For analog 0-10 volt dimming, it is preferred types 1, 2, 3 and 6 are toggled via the timer switch. Timer switch 881 can be connected wirelessly or to internet via Wi-Fi module 896.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Notwithstanding specific embodiments of the invention have been described and illustrated, the invention is not to be limited to the specific forms or arrangements of parts so described and illustrated. The scope of the invention is to be defined by the claims and their equivalents included herein or by reference to a related application.

What is claimed is:

1. A system adapted to retrofit a fluorescent tube lamp, comprising:
   a group of elongated LED (light emitting diode) strips arranged on the fluorescent tube lamp;
   a set of diversion switches configured to reroute existing electric current to power the elongated LED strips and bypass an existing ballast;
   a dimmable constant current LED driver;
   a set of diodes arranged in an isolation circuit configured to prevent power outflow and condition electric current to the LED driver;
   a multi-level dimming module configured to set a light intensity of the LED strips; and
   an input power source feed select switch for the dimming module, the isolation diodes, the LED driver and the LED strips.

2. The system of claim 1, wherein each diversion switch comprises an isolation blade, a splice blade, a hold blade and a cutoff blade within a switch body having an entrance and exit chamber, the blades configured to electrically bridge two wires placed into the switch and provide sufficient holding force to prevent the wires from being pulled out of the switch.

3. The system of claim 1, wherein each diversion switch comprises a cutting slot situated on a side of a body of the switch between an entrance and an exit chamber of the body, the cutting slot configured to provide access for a pair of wire cutting pliers to sever a plurality of wires inserted into the switch.

4. The system of claim 1, wherein each diversion switch comprises a splice blade positioned between an entrance and an exit chamber of a body of the switch, the splice blade adapted to bridge at least two wires inserted through the switch based on a crimping of the slice blade.

5. The system of claim 1, wherein each diversion switch comprises an isolation blade configured to push severed conductive wires apart based on closing a lid of the switch.

6. The system of claim 1, wherein the diversion switch comprises an open faced top-load style with a hinged lid and an "S" shaped slit blade configured to assemble two parallel wires from a top side of the diversion switch.

7. The system of claim 1, wherein each diversion switch comprises a plug and a socket configured to mate and revert electric current back to original paths.

8. The system of claim 1, wherein the dimmable constant current LED driver comprises a phase cut dimmer circuit configured to control LED tube intensity.

9. The system of claim 1, wherein the isolation diodes are in a full bridge configuration able to block off higher potential voltage from flowing out of the LED tube for installer safety.

10. The system of claim 1, wherein the multi-level dimming module is detachable from the constant current LED driver and operates by shunting a selected group of LED strings mounted on a body of the LED tube.

11. The system of claim 1, wherein the dimming module monitors a power lost event and advances one count to activate a relay switch contact shunting a selected group of LED strings to effect multi-level dimming.

12. The system of claim 1, further comprising an analog dimming power output driver and a power lost detector adapted to advance one count on every power loss and activate a relay to alter a resister voltage value and effect analog dimming.

13. The system of claim 1, further comprising a group of elongated LED strips arranged in alternating linear fashion wherein dimming is by shunting a selected group of LED.

14. The system of claim 1, further comprising a fixture of two diversion switches inserted between electrical power and a primary side of an existing ballast and two diversion switches inserted between LED tube pins and a secondary side of an existing ballast.

15. The system of claim 1, further comprising a fixture of two diversion switches inserted between electrical power and a primary side of an existing ballast and one diversion switch inserted between each opposite end of an LED tube pin and a secondary side of an existing ballast.

16. The system of claim 1, wherein the dimming module is configured to interpret rapid AC power pulses from a phase cut dimmer switch as coded signals for the relay switch to shunt a LED group and effect dimming.

17. The system of claim 1, wherein the dimming module is configured to interpret rapid AC power pulses from a regular wall switch as coded signals for the relay switch to shunt a LED group to effect dimming.

18. The system of claim 1, wherein the dimming module is configured to interpret rapid AC power pulses from a preprogrammed light intensity switch as coded signals for the relay switch to shunt a LED group to effect dimming.

19. A system adapted to retrofit a fluorescent tube lamp, comprising:
   a group of elongated LED (light emitting diode) strips arranged on the fluorescent tube lamp;
   a set of two diversion switches configured to reroute existing electric current to power the elongated LED strips and bypass a primary side of an existing ballast;
   a dimmable constant current LED driver;
   a set of diodes arranged in an isolation circuit configured to prevent power outflow and condition electric current to the LED driver;
   a multi-level dimming module configured to set a light intensity of the LED strips; and
   an input power source feed select switch for the dimming module, the isolation diodes, the LED driver and the LED strips.

20. The system of claim 19, wherein each diversion switch further comprises a pigtail wire terminated in a socket configured to mate with a plug directly wired to a driver of the LED tube for electric power pickup based on a bypass of the existing LED tube pins for power.

* * * * *